US008032088B2

United States Patent
Koskela

(10) Patent No.: US 8,032,088 B2
(45) Date of Patent: Oct. 4, 2011

(54) METHOD, APPARATUS, NETWORK ELEMENT AND SOFTWARE PRODUCT FOR LOCATION AREA UPDATE OPTIMIZATION

(75) Inventor: Jarkko Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 663 days.

(21) Appl. No.: 11/728,195

(22) Filed: Mar. 23, 2007

(65) Prior Publication Data
US 2008/0026698 A1    Jan. 31, 2008

Related U.S. Application Data

(60) Provisional application No. 60/785,575, filed on Mar. 23, 2006.

(51) Int. Cl.
*H04B 1/00*    (2006.01)
(52) U.S. Cl. .......... 455/68; 370/328; 370/351; 370/356; 370/443; 455/450
(58) Field of Classification Search .................... 455/68, 455/3.04, 3.06, 416, 426.1, 432, 432.1, 433, 455/433.1, 435.1, 436, 438, 439, 445, 453, 455/458, 560, 561, 517, 518, 519, 521; 370/328, 370/351, 356, 443
See application file for complete search history.

(56) References Cited

U.S. PATENT DOCUMENTS

| | | | |
|---|---|---|---|
| 6,609,004 B1 * | 8/2003 | Morse et al. ............... | 455/456.5 |
| 6,707,809 B1 * | 3/2004 | Warrier et al. ................ | 370/351 |
| 2003/0040314 A1 * | 2/2003 | Hogan et al. .................. | 455/435 |
| 2007/0161377 A1 * | 7/2007 | Kodikara Patabandi et al. ........................... | 455/450 |

* cited by examiner

*Primary Examiner* — Kent Chang
*Assistant Examiner* — Dinh Nguyen

(57) ABSTRACT

A method, apparatus, software product, and network element enable a user equipment to operate in an idle mode, to sense a change in the broadcasted location area, and to then report that change to a network without requiring a dedicated connection to the network. This embodiment is achieved by sending an identifier via an uplink transport channel, and then the user equipment receives a resource allocation that is based at least partly on the identifier. The user equipment provides an uplink signal via the allocated resource, including a user equipment identity in the uplink signal. When the user equipment receives confirmation, including the user equipment identity, then the user equipment reenters the idle mode. The uplink signal provided an update as to the location area of the user equipment, although other types of signals can instead be provided this way to the network.

19 Claims, 5 Drawing Sheets

METHOD, APPARATUS, NETWORK ELEMENT AND SOFTWARE PRODUCT FOR LOCATION AREA UPDATE OPTIMIZATION

CROSS-REFERENCE TO RELATED APPLICATION

The present application claims priority to U.S. Provisional Application No. 60/785,575 filed Mar. 23, 2006.

FIELD OF THE INVENTION

The present invention relates to wireless communication, and more particularly to idle mode signaling.

BACKGROUND OF THE INVENTION

LTE, or Long Term Evolution (also known sometimes as 3.9G) is a name for research and development, involving the Third Generation Partnership Project (3GPP), to identify technologies and capabilities that can improve systems such as the Universal Mobile Telecommunications System (UMTS). It is known that a user equipment (UE) will be in an idle state when it is not in a connected state. Once in the connected state, there are a number of possible states that the UE can be in, and it is often possible to transition between those states. LTE is concerned with both the idle state as well as the connected states.

A Radio Link Identity (RLID) is similar to a Cell Radio Network Temporary Identifier (C-RNTI) in the Universal Terrestrial Radio Access Network (UTRAN). In the LTE, a user equipment (UE) in idle mode does not automatically have a cell-specific RLID which may be needed by the network (NW) so as to allocate resources for sending and/or receiving data. Thus, when the UE attempts to perform some procedure in idle mode, such as attempting a Location Area Update (LAU), the UE often needs to receive the RLID in order to be able to communicate with the NW. Obtaining the RLID sometimes requires quite a lot of signaling, and it would be desirable to reduce or eliminate that amount of signaling.

Location updating is a procedure used to ensure that the network knows the location of the UE when the UE is in an idle state. In this state, the UE does not have an active signaling connection to the network, but nevertheless the network is responsible for tracking the location of the UE. For example, the UE can decode a broadcasted location area identifier of the UE's current cell, and if the location area identifier changes, due to movement of the UE, then the UE can perform an LAU to notify the network. One possible purpose for the network to have this kind of location awareness is to control the amount of paging required by the network in order to reach a specific UE; the network can merely page those specific cells that are part of the location area where the UE is located.

In former systems, such as the Global System for Mobile (GSM) Communications Enhanced Data Rates for Global Evolution (EDGE) Radio Access Network (GERAN) and such as UTRAN, the UE has needed to establish a dedicated connection in order to perform the location area update (LAU). Unfortunately, that has entailed a relatively inefficient use of resources.

SUMMARY OF THE INVENTION

Signaling is optimized to avoid a dedicated connection when providing updates regarding location area. An LAU is provided without any need to allocate an RLID. The MS does not need to enter an active state in order to provide the LAU. The same approach may also be used for other idle mode signaling, aside from LAU signaling.

According to an embodiment of the present invention, a user equipment operates in an idle mode, and then senses a change in the broadcasted location area, which indicates that the user equipment has moved to a different location area. The user equipment then reports that location change to a network, without requiring a dedicated connection to the network. This embodiment is implemented by sending an identifier via an uplink transport channel from the user equipment, and then the user equipment receives a resource allocation that is based at least partly on the identifier. The user equipment then provides an uplink signal via the allocated resource, including a user equipment identity in the uplink signal. When the user equipment receives confirmation that the uplink signal has been properly received at the network side, then the user equipment reenters the idle mode. The uplink signal provided an update as to the location area of the user equipment, although other types of signals can instead be provided in a similar manner to the network, without requiring a dedicated connection and without requiring a radio link identification (RLID).

DETAILED DESCRIPTION

An exemplary embodiment of the invention will now be described, in which signalling to acquire an RLID is eliminated. The UE and NW interact in a series of five basic steps.

First, the UE sends a random identifier (RAID) via an uplink transport channel such as a random access channel (RACH). It is possible, for instance, for the UE to send the RAID with a field indicating a location area update (LAU).

Second, the network allocates resources for the UE using the RAID. If the RACH contained a field indicating an LAU, then the NW is able to allocate a correct amount of resources for the UE for the task at hand.

Third, the UE sends an LAU, using either upper layer or radio resource control (RRC) signalling, via the allocated resource. The identity in the LAU is either an International Mobile Subscriber Identity (IMSI) or some known temporary identity such as a Packet Temporary Mobile Subscriber Identity (P-TMSI), or such as a UE Temporary Identity (UE_TID) which is similar to P-TMSI in GERAN/UTRAN. Using IMSI may be needed if the allocator of the known temporary identity has changed since last LAU procedure.

Fourth, the NW sends a LOCATION AREA UPDATE CONFIRM message with RAID and UE_TID, and possibly IMSI if the LAU was sent with IMSI. This UE_TID/IMSI would solve any conflicts in the RACH-procedure.

Figure 1:
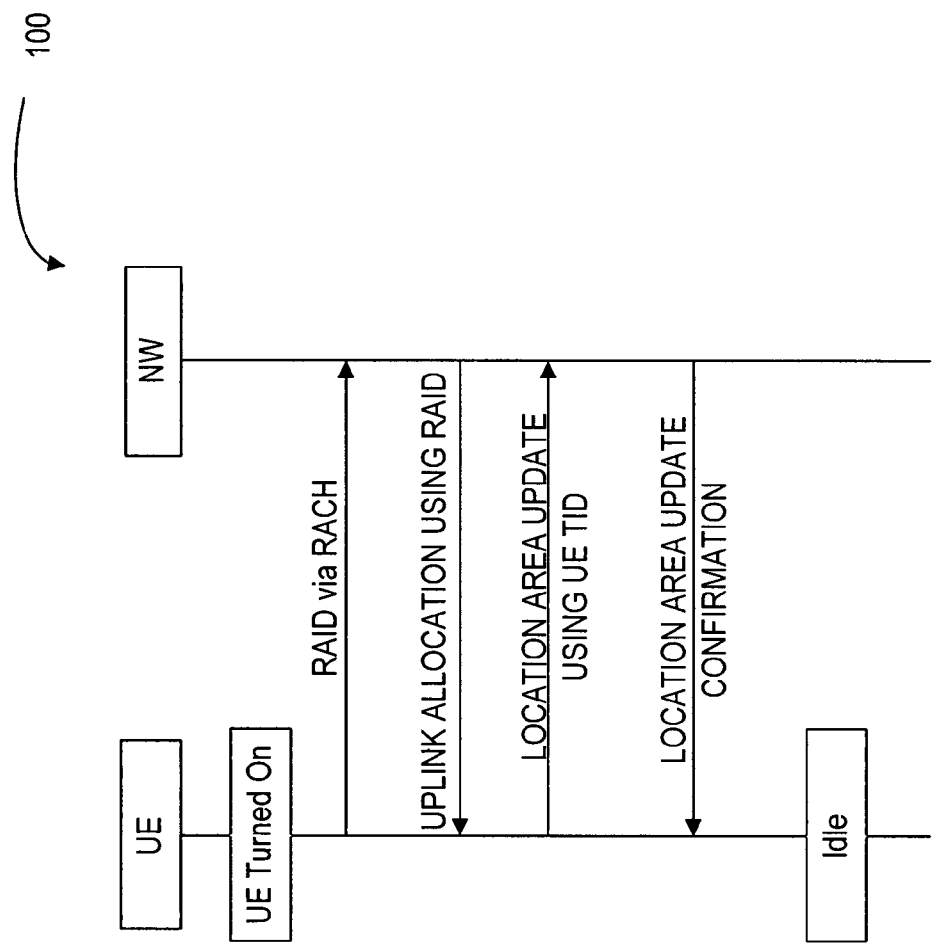
FIG. 1 is a signaling diagram with optimization according to an embodiment of the present invention.

Fifth, the UE will reenter idle-mode, having successfully updated its location to the NW. These five general steps are shown by the signalling diagram 100 of FIG. 1.

When the UE sends the LAU to the NW, it might be necessary for the base station (BS) to forward the LAU with the RAID to a network element handling mobility. The RAID may be needed when the peer entity responds to the LAU. The BS would then be able to allocate a correct resource to the RAID, and therefore the correct UE would receive the LAU CONFIRM, which included the UE_TID.

This embodiment of the invention will prevent unneeded cell specific identity (RLID) acquisition in the LAU procedure, and some signalling is saved as well. Additionally, the UE does not need to enter an active state. It is noted that the same or a similar approach may also be used also for other idle mode signalling, as necessary.

Figure 2:
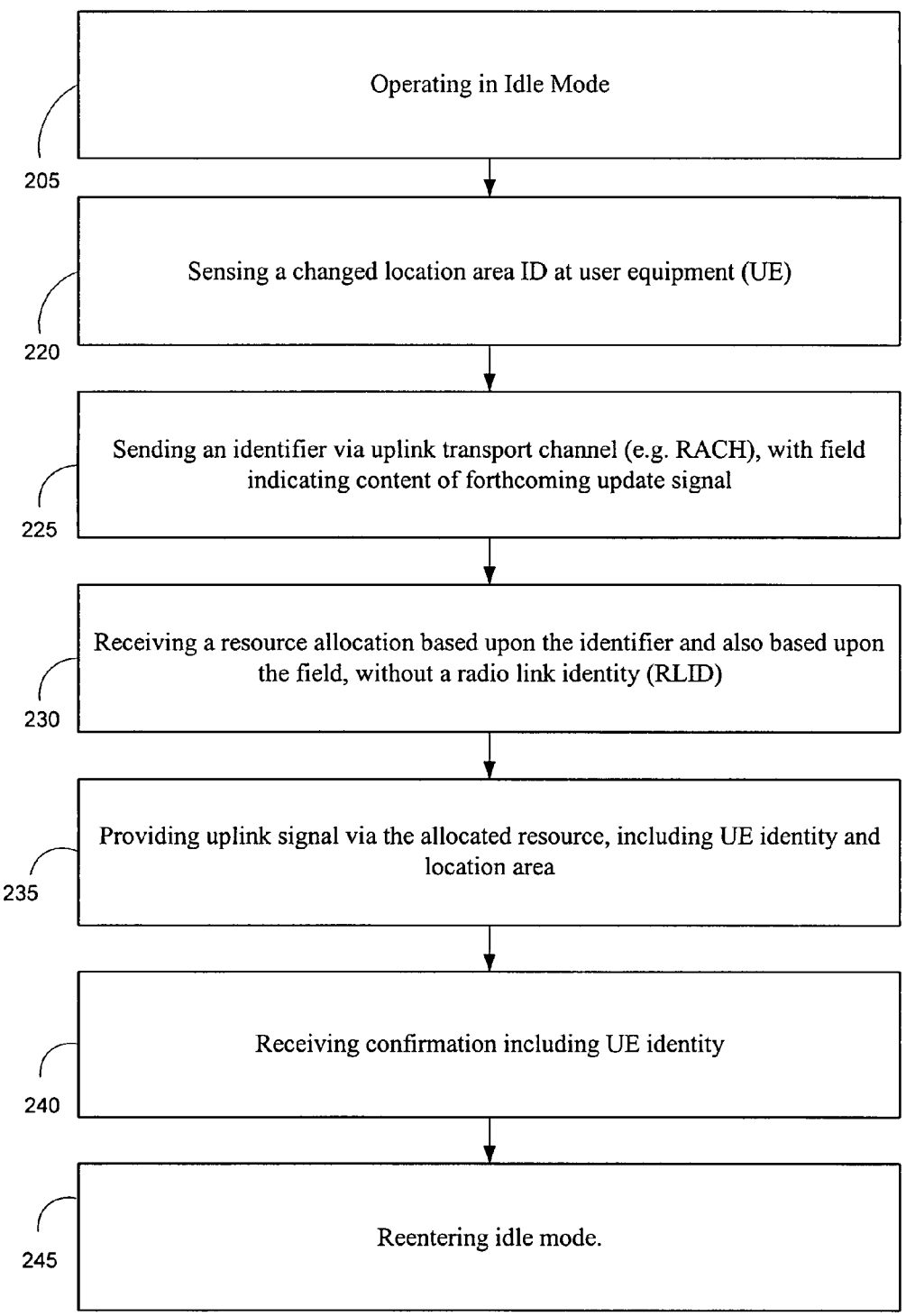
FIG. 2 is a flow chart depicting a method according to an embodiment of the present invention.

Turning now to FIG. 2, the flow chart shows how an embodiment of a method 200 according to the present invention. User equipment begins by operating 205 in the idle mode. Then, the user equipment senses 220 a changed location area identification, for example by monitoring a broadcast location area. Then, the UE sends 225 an identifier via an uplink transport channel such as RACH, in order to begin the process of reporting the location change to the network; the identifier can be accompanied by a field indicating content of a forthcoming update signal (e.g. the content in this case would be a location area update). The UE subsequently receives 230 a resource allocation which is based upon the identifier previously sent by the UE, and is also based upon the field. It is not necessary for the resource allocation to include a radio link identity (RLID). In a step 235, the uplink signal is provided by the UE, via the resource allocated in step 230, and the uplink signal includes the UE identity, plus the location area of the UE. Then, the UE receives 240 confirmation from the network that the uplink signal was properly received, and the confirmation includes the UE identity.

Figure 3:
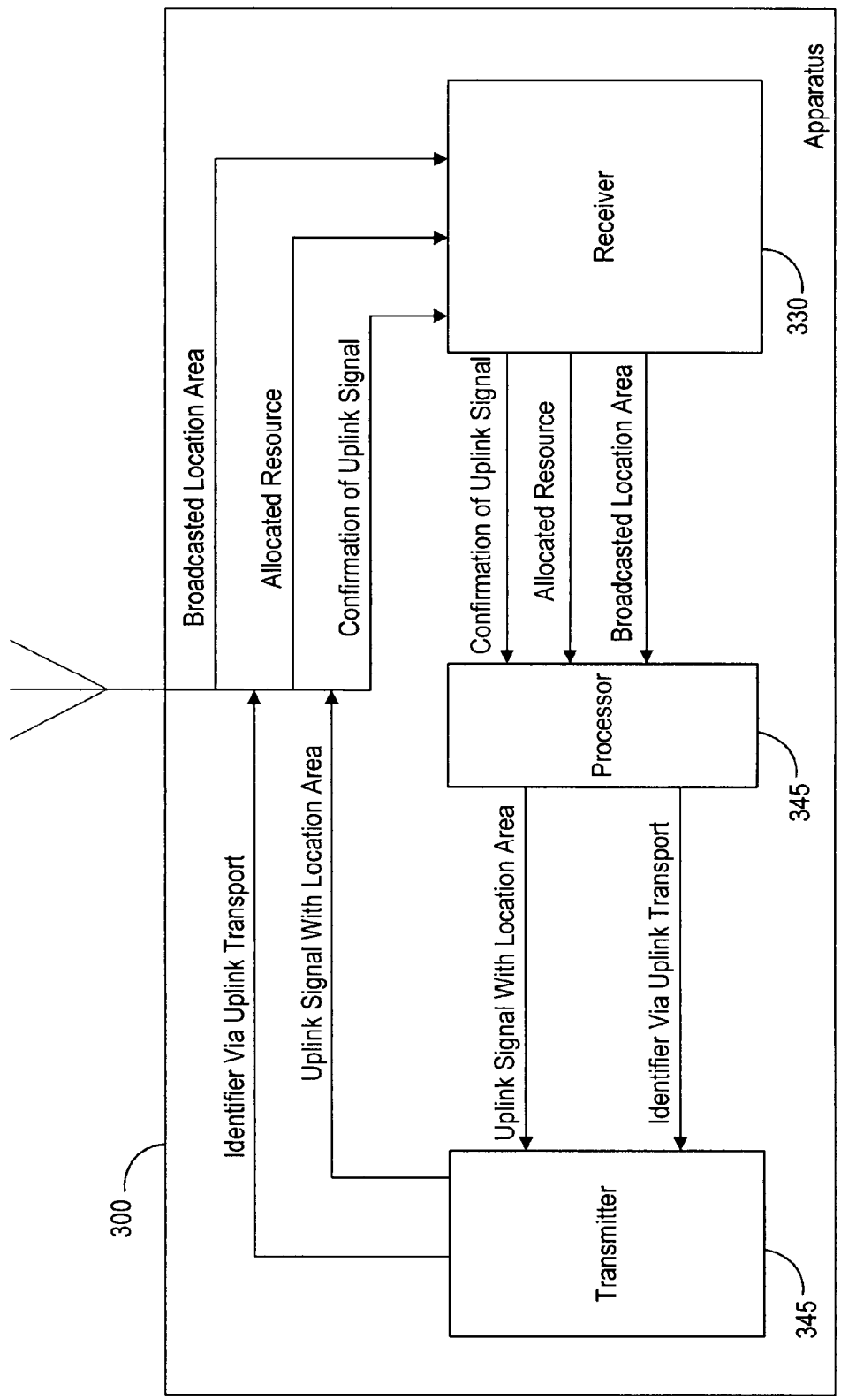
FIG. 3 is an apparatus according to an embodiment of the present invention.

Turning to FIG. 3, an apparatus 300 according to an embodiment of the present invention is shown. A broadcasted location area is received by a receiver 330, and passed along to a processor 345. If the broadcasted location area is different from what it was previously, then the processor initiates an identifier via uplink transport channel, which is transmitted by a transmitter 345. In consequence, the receiver 330 receives an allocated resource, which again is communicated to the processor 345. Using the allocated resource, the processor initiates an uplink signal with location area, which is transmitted to the network by the transmitter 345. The network then responds with a confirmation of the uplink signal, that confirmation is received by the receiver 330, which communicates the confirmation to the processor 345. At that point, the processor 345 can return the apparatus to idle mode.

Figure 4:
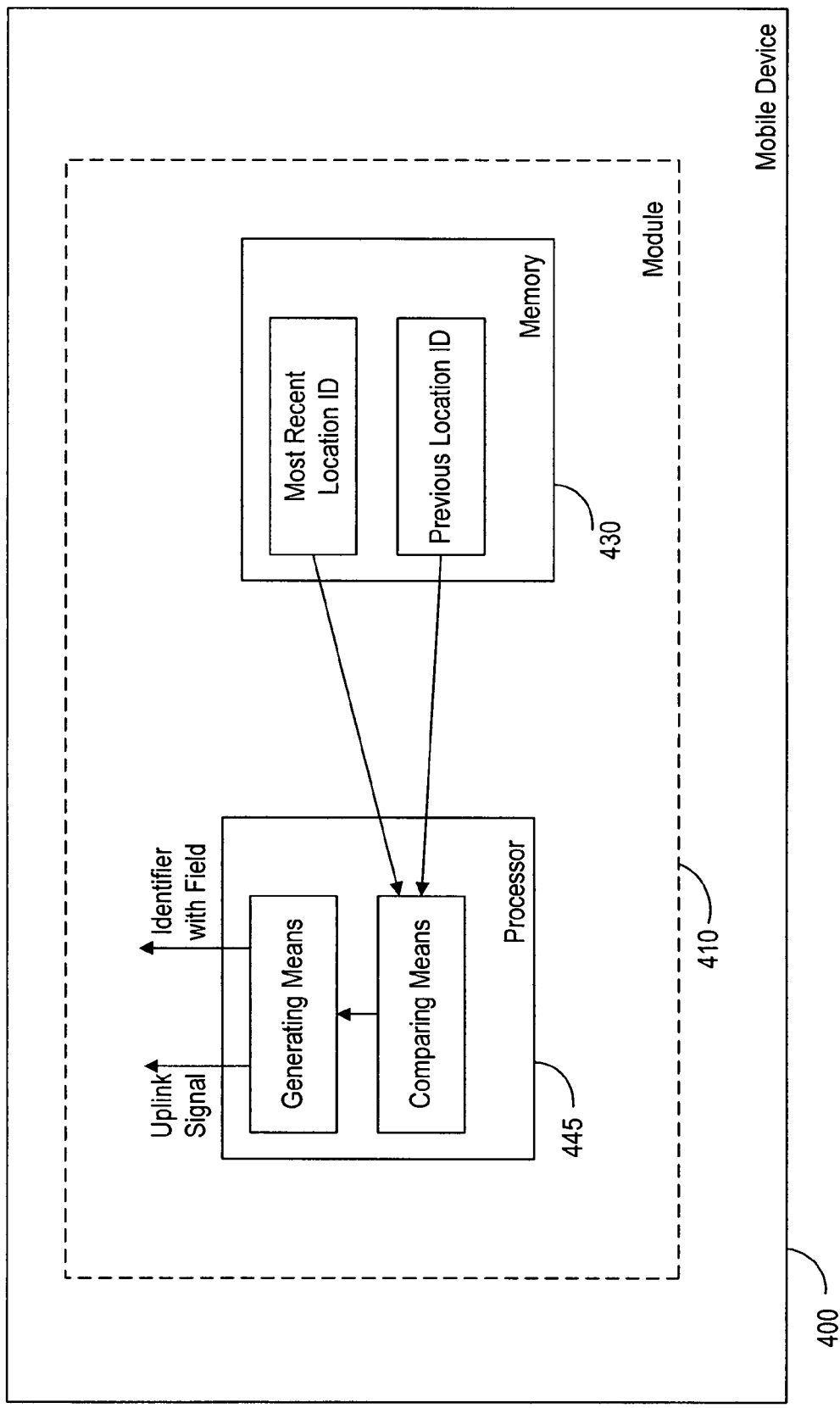
FIG. 4 is a module of a mobile device according to an embodiment of the present invention.

FIG. 4 shows a module 410 of a mobile device 400, according to an embodiment of the present invention. The module 410 includes a memory 430 and a processor 445. The memory stores, and makes available to the processor, a most recent location area identification, and a previous location area identification. The processor 445 includes means to compare those two ID's, and if they are different from each other then a generating means in the processor 445 will generate an identifier (with field indicating that location data will be forthcoming), and the generating means 445 will then (after receiving a resource allocation from the network) generate an uplink signal containing the most recent location area information.

The method in FIG. 2 can be implemented by software operating in the module 410 of FIG. 4. Such software can be run using a general purpose or specific-use computer system, with standard operating system software conforming to the method described herein. The software is designed to drive the operation of the particular hardware of the system, and will be compatible with other system components and I/O controllers. The computer system of this embodiment includes the CPU processor 445 shown in FIG. 4, comprising a single processing unit, multiple processing units capable of parallel operation, or the CPU can be distributed across one or more processing units in one or more locations, e.g., on a client and server. Memory 430 may comprise any known type of data storage and/or transmission media, including magnetic media, optical media, random access memory (RAM), read-only memory (ROM), a data cache, a data object, etc. Moreover, similar to CPU 445, memory 430 may reside at a single physical location, comprising one or more types of data storage, or be distributed across a plurality of physical systems in various forms.

Figure 5:
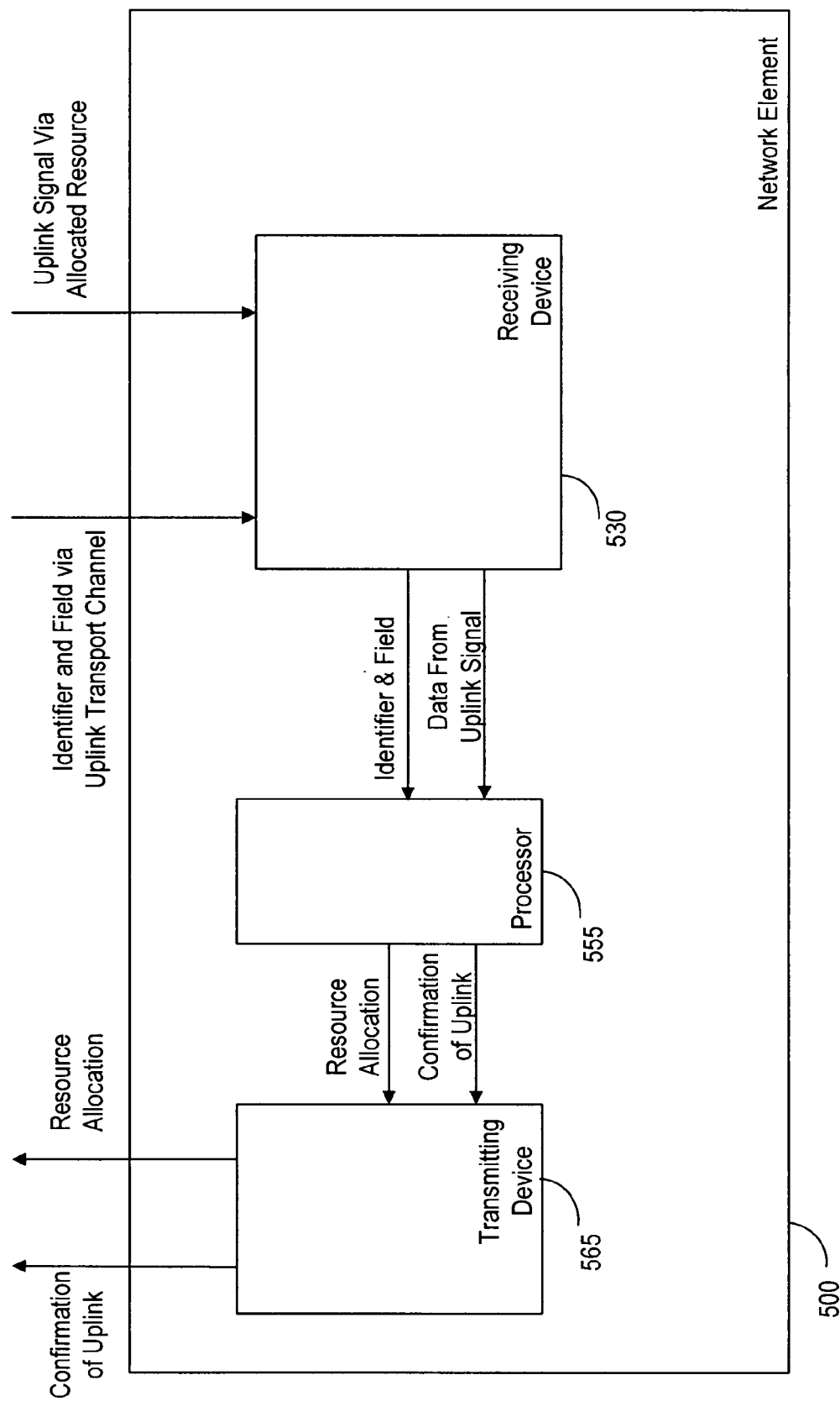
FIG. 5 is a network element according to an embodiment of the present invention.

FIG. 5 shows a network element 500 according to an embodiment of the present invention. The network element includes a receiving device 530, a processor 555, and a transmitting device 565. The receiving device will receive an identifier and a field, via an uplink transport channel, and will pass along the identifier and the field to the processor 555. The processor 555 will then generate a resource allocation, which is then transmitted by the transmitting device 565. Subsequently, the receiving device 530 will receive an uplink signal via the allocated resource, and will pass along data therefrom to the processor 555. The processor will then generate a confirmation of having received the uplink, and the confirmation will be transmitted by the transmitting device 565.

It is to be understood that all of the present figures, and the accompanying narrative discussions of best mode embodiments, do not purport to be completely rigorous treatments of the method, apparatus, network element, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various combinations of hardware and software which need not be further detailed herein.

What is claimed is:

1. A method comprising:
    operating an apparatus in an idle state;
    sensing a broadcasted location area identification indicative of a location area of the apparatus;
    operating the apparatus in an idle state signalling mode in case of sensing a new location area of the apparatus by sending an identifier selected in the apparatus via an uplink transport channel wherein the identifier is a random identifier and the uplink transport channel is a random access channel;
    receiving a resource allocation that is based at least partly on the identifier wherein the allocated resource lacks a radio link identity;
    providing an uplink signal via the allocated resource that uses either upper layer or radio resource control signalling, including a user equipment identity in the uplink signal, wherein the uplink signal includes an update as to the apparatus in the new location area;
    receiving confirmation, including the user equipment identity; and
    reentering the idle state, from the idle state signalling mode.

2. The method of claim 1, wherein the method is carried out by the signalling by the apparatus in the idle state signalling mode without entering an active state having a dedicated radio link connection established.

3. The method of claim 1, wherein the identifier is accompanied by a field indicative of forthcoming contents of the uplink signal, and
wherein the resource allocation is based at least partly on the field.

4. The method of claim 3, wherein the forthcoming contents include an update as to the location area of the apparatus.

5. The method of claim 2, wherein the user equipment identity is the international mobile subscriber identity, if an allocator of the temporary identity has changed since a previous uplink signal.

6. A computer program product comprising a non-transitory medium with program code stored thereon for causing a processor to execute the method of claim 1.

7. An apparatus comprising:
means for sensing a broadcasted location area identification indicative of a new location area of the apparatus;
means for interrupting an idle state and operating the apparatus in an idle state signalling mode in case of sensing a new location area of the apparatus by sending an identifier selected in the apparatus via an uplink transport channel wherein the identifier is a random identifier and the uplink transport channel is a random access channel;
means for receiving a resource allocation that is based at least partly on the identifier wherein the allocated resource lacks a radio link identity;
means for generating an uplink signal via the allocated resource allocated at least based partly on the identifier, wherein the uplink signal includes an update as to the apparatus in the new location area;
means for receiving confirmation of the uplink signal, the identifier included in the confirmation; and
means for reentering the idle state, from the idle state signalling mode.

8. The apparatus of claim 7, wherein the confirmation concludes the interrupting the idle state and is followed by a return to the idle state such that the update is performed in the idle state signalling mode without establishing any dedicated connection in a connected state.

9. An apparatus comprising:
at least one processor; and
at least one memory including computer program code, the at least one memory and the computer program code configured to, with the at least one processor, cause the apparatus at least to:
sense a broadcasted location area identification indicative of a location area of the apparatus;
interrupt an idle state of the apparatus and operate the apparatus in an idle state signalling mode in case of sensing a new location area of the apparatus by sending an identifier via an uplink transport channel wherein the identifier is a random identifier selected by the apparatus and the uplink transport channel is a random access channel;
receive a resource allocation that is based at least partly on the identifier wherein the allocated resource lacks a radio link identity;
generate an uplink signal via a resource allocated at least based partly on the identifier wherein the allocated resource uses either upper layer or radio resource control signalling and lacks a radio link identity, wherein the uplink signal includes an update as to the apparatus in the new location area;
receive confirmation of the uplink signal, the identifier being included in the confirmation; and
reenter the idle state, from the idle state signalling mode.

10. The apparatus of claim 9, wherein the confirmation concludes the interruption of the idle state and is followed by the apparatus reentering the idle state such that the update is performed in the idle state signalling mode without establishing any dedicated connection in a connected state.

11. A computer program product comprising a non-transitory computer useable medium having computer readable program code embodied therein, the computer readable program code embodied in the computer readable medium configured, when run on a processor of an apparatus, to cause the apparatus to:
sense a broadcasted location area identification indicative of a location area of the apparatus;
interrupt an idle state of the apparatus, in case of sensing a changed location area, and operate the apparatus in an idle state signalling mode by sending an identifier in an idle state signalling mode via an uplink transport channel wherein the identifier is a random identifier selected by the apparatus and the uplink transport channel is a random access channel;
receive a resource allocated at least partly based on the identifier wherein the allocated resource lacks a radio link identity;
generate an uplink signal via said resource allocated at least partly based on the identifier, wherein the uplink signal includes an update as to the apparatus in the changed location area; and
accept confirmation of the uplink signal, the identifier being included in the confirmation, and
cause a reentry of the apparatus into the idle state from the idle state signalling mode.

12. A computer program product according to claim 11,
wherein the update is performed without establishing a dedicated connection in a connected state.

13. An apparatus comprising:
at least one processor; and
at least one memory including computer program code, the at least one memory and the computer program code configured to, with the at least one processor, cause the apparatus at least to:
sense, in an idle state, a broadcasted location area identification indicative of a location area of the apparatus;
store a most recent received location area identification; and
compare the most recent received location area identification to a previous received location area identification,
generate, if the at least one processor determines that the location area identification has changed, an identifier for transmission in an idle state signalling mode via an uplink transport channel wherein the identifier is a random identifier selected by the apparatus and the uplink transport channel is a random access channel, and after receipt of a resource allocated at least partly based on the identifier, also generate an uplink signal for transmission via the resource allocated at least partly based on the identifier, wherein the allocated resource uses either upper layer or radio resource control signalling and lacks a radio link identity and wherein the uplink signal includes an update as to the apparatus in the most recent received location area identification;
receive confirmation, including the identifier; and
reenter the idle state from the idle state signalling mode.

14. The module of the mobile device of claim 13,
wherein the identifier for transmission in the idle state signalling mode via the uplink transport channel is accompanied by a field indicative of forthcoming contents of the uplink signal, and wherein the allocated resource is based at least partly on the field.

15. A network element comprising:

at least one processor; and at least one memory including computer program code, the at least one memory and the computer program code configured to, with the at least one processor, cause the apparatus at least to:

broadcast a location area identification indicative of a location area of the network element;

receive an identifier via an uplink transport channel wherein the identifier is a random identifier selected by an apparatus in an idle state signalling mode and the uplink transport channel is a random access channel; and allocate a resource at least based partly on the identifier and send it to the apparatus wherein the allocated resource uses either upper layer or radio resource control signalling and lacks a radio link identity, receive an uplink signal from the apparatus in the idle state signalling mode via the allocated resource, the uplink signal including an apparatus identity wherein the uplink signal includes an update as to the apparatus newly located in the location area of the network element; and send a confirmation of the uplink signal, the apparatus identity being included in the confirmation to enable the apparatus to reenter the idle state from the idle state signalling mode.

16. The network element of claim 15, wherein the identifier is accompanied by a field indicative of forthcoming contents of the uplink signal, and wherein allocating the resource is based at least partly on the field.

17. The apparatus of claim 9, wherein the identifier is based at least in part on either an international mobile subscriber identity or a temporary identity.

18. The apparatus of claim 13, wherein the update is carried out without entering an active state requiring establishment of a dedicated radio link connection.

19. The network element of claim 15, wherein the update is carried out without establishing a dedicated connection to the apparatus.

* * * * *